Figure 1:
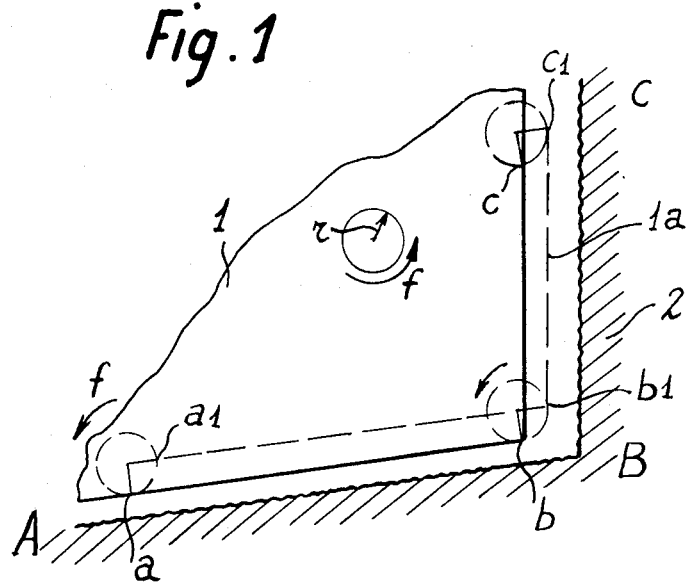

United States Patent [19]

Braudeau et al.

[11] 4,041,268

[45] Aug. 9, 1977

[54] METHOD FOR ADJUSTING THE ECCENTRICITY OF A SPARK-EROSION MACHINING ELECTRODE ENDOWED WITH A MOVEMENT OF CIRCULAR TRANSLATION AND A DEVICE FOR THE APPLICATION OF SAID METHOD

[75] Inventors: Pierre Braudeau, Paris; Alfred Marie Aimé Maillet, Versailles, both of France

[73] Assignee: Carel Fouche Languepin, Paris, France

[21] Appl. No.: 669,521

[22] Filed: Mar. 23, 1976

[30] Foreign Application Priority Data

Mar. 25, 1975  France .............................. 75.09252

[51] Int. Cl.² .............................................. B23P 1/08
[52] U.S. Cl. ............................... 219/69 G; 219/69 M; 219/69 V; 219/69 E
[58] Field of Search ............... 219/69 V, 69 W, 69 R, 219/69 M, 69 G, 69 C, 69 E; 318/39; 74/117, 69

[56] References Cited

U.S. PATENT DOCUMENTS

| 3,135,852 | 6/1964 | Bentley et al. ..................... 219/69 V |
| 3,433,919 | 3/1969 | Bradeau et al. .................... 219/69 V |
| 3,539,754 | 11/1970 | Furze et al. ....................... 219/69 V |
| 3,694,599 | 9/1972 | Davis ................................. 219/69 G |
| 3,781,507 | 12/1973 | Inoue ................................. 219/696 |
| 3,825,714 | 7/1974 | Marendaz ......................... 219/69 M |
| 3,849,624 | 11/1974 | Dulebohn et al. ................ 219/69 W |

FOREIGN PATENT DOCUMENTS

| 79,637 | 11/1962 | France |
| 80,012 | 1/1963 | France |
| 80,424 | 3/1963 | France |

*Primary Examiner*—Bruce A. Reynolds
*Attorney, Agent, or Firm*—Young & Thompson

[57] ABSTRACT

After pre-forming of a cavity in a workpiece by means of an electrode of male form, movements of circular translation of increasing relative eccentricity are imparted to the electrode or the workpiece in order to complete machining of the cavity by the spark-erosion process while adjusting the eccentricity in successive steps. The orbital motion is stored in memory during at least one period of travel whilst the electrode-workpiece potential difference is compared with a reference voltage. A control signal delivered as a result of the comparison initiates the progression of eccentricity by one step when the potential difference has remained continuously higher than the reference voltage during the period of travel.

8 Claims, 5 Drawing Figures

METHOD FOR ADJUSTING THE ECCENTRICITY OF A SPARK-EROSION MACHINING ELECTRODE ENDOWED WITH A MOVEMENT OF CIRCULAR TRANSLATION AND A DEVICE FOR THE APPLICATION OF SAID METHOD

This invention relates to a method for automatically adjusting the eccentricity of a spark-erosion electrode to which is imparted a circular movement of translation and to a device for carrying out said method, said electrode being intended to serve as a tool for lateral boring of a preformed cavity.

It is known that the electrode is mounted accordingly in a device which is sometimes referred-to as an "all-profile boring head", examples of construction of this device being described in particular in French Pat. No. 1,274,953, U.S. Pat. No. 3,433,919, Aug. 26th, 1960 and patents of Addition No. 79,637 of April 4th, 1961, No. 80,012 of June 16th, 1961 and No. 80,424 of July 17th, 1961 as well as in French Pat. Application No. 74,04,869 of Feb. 13th, 1974, U.S. Application Ser. No. 672,615.

The principle of operation of the majority of these devices consists in applying movements of circular translation of increasing eccentricity to the electrode or if necessary to the workpiece to be machined, thus permitting successive machining passes in order to perfect the walls of a cavity which has been pre-formed by vertical penetration of said electrode into the workpiece.

The sparks which are emitted during these machining passes and perform a virtual lateral boring operation are of progressively decreasing power and shorter length.

The emission of said sparks from the sides of the electrode therefore entails the need for a progressive increase in the eccentricity imparted to the movement of circular translation to which the boring head is subjected, with the result that the electrode and the sides of the cavity which this latter is intended to machine are always sufficiently close together but not to any excessive degree by reason of the potential hazard of short-circuits.

The present invention proposes the automatic control of the increase in eccentricity to be given to the boring head which carries the electrode during finishing of the sides of a cavity which has just been pre-formed, the finishing operation being performed by the action of sparks of increasing fineness which are emitted between the sides of the electrode and the opposite walls of the cavity.

In the usual technique, an operator controls the increases in eccentricity by hand by referring as a rule to a voltmeter which is connected between the electrode and the workpiece to be machined and which provides the operator with information on the variations in minimum distance from one to the other. Similar information can be deduced from the indications supplied by an ammeter which is placed in series in the discharge circuit by reason of the fact that, all other things being equal, the electrode-workpiece voltage varies as a direct function of the electrode-workpiece distance and the current in the opposite direction.

Since the head subjects the electrode to a given degree of eccentricity in the orbital motion of the electrode, a certain extent of machining of all the sides of the cavity corresponds to each movement of travel of the electrode and the electrode-workpiece distance thus generally increases as well as the voltage whilst the current intensity decreases. After a certain number of movements of travel, the voltage tends to stabilize at a value which is slightly lower than its open-circuit value. It is then an appropriate time to increase the eccentricity of the head to a certain extent in order to bring the electrode and the workpiece closer together.

In fact, as will be shown in detail hereinafter, the voltage is far from being constant during each movement of travel of the electrode since the minimum distance between the points which are nearest the electrode and the workpiece varies not only cyclically as a function of the cross-section of the electrode but also by reason of the state of progress of the machining operation.

An increase in eccentricity must therefore be initiated only when it becomes certain that this minimum distance is always greater than the increase in eccentricity which is contemplated.

At a predetermined open-circuit supply potential, the value of the voltage between the electrode and the workpiece being a representation of the minimum distance aforesaid at each instant, steps are taken in accordance with the invention to store the orbital motion in memory during at least one movement of travel and starting from a zero-point signal whilst the potential difference between the electrode and the workpiece is compared with a reference voltage during this movement of travel with a view to delivering a signal to the eccentricity control element in order to cause the progression of said eccentricity by one step when said potential difference has remained continously higher than the reference voltage during said movement of travel.

In a simple embodiment, the delivery of the zero-point signal can be initiated during each movement of travel by the passage of a member of the rotary system in front of a stationary element, thereby initiating the orbital motion of the electrode within the head.

When a movement of travel is of long duration, say several minutes, the design mentioned above has the disadvantage in the most unfavorable cases of retarding the initiation of eccentricity adjustment by a time interval which, though of shorter value, can nevertheless be close to that of a movement of travel of such long duration.

In consequence, the zero-point signal is preferably initiated as soon as the voltage between electrode and workpiece exceeds the reference value; and if this voltage becomes lower than the reference voltage during a movement of travel, the storage device is immediately reset to zero in order to be again put into service at the following voltage overshoot.

The storage device can be a timing system which is set at the time of a movement of travel and can be of any suitable type, namely either electronic, electric or even mechanical. Preferably, this device is a binary counter which receives pulses supplied either by a time-base, in which case the counter must be adjusted so as to ensure that its capacity corresponds at least to the duration of one movement of travel, taking into account the elementary period of the time-base, or by a pulse source which is activated by the rotational motion of the head.

One important advantage of the invention lies in the fact that it permits automatic control of eccentricity of the electrode in steps of very small amplitude, for example of the order of 0.01 mm, so as to maintain the electrode as close as possible to the workpiece and consequently to maintain machining outputs at values which are as close as possible to maximum values.

The advantage of automatic control of eccentricity of the head is therefore to replace a more or less accurate estimation of the operator by orders given as a function of precise measurements which serve to endow the head with maximum efficiency and prevent any danger of untimely increase in eccentricity which would give rise to short-circuits.

Furthermore, automatic control avoids the need for the constant presence of an operator during "boring" operations, thus clearly reducing operating costs.

Figure 2:
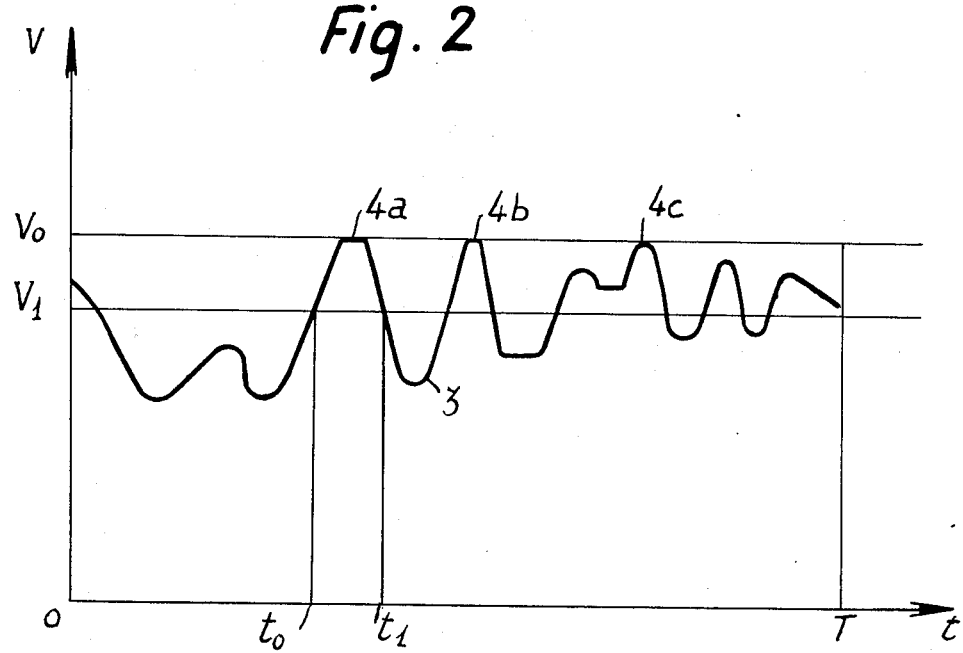
Figure 3:
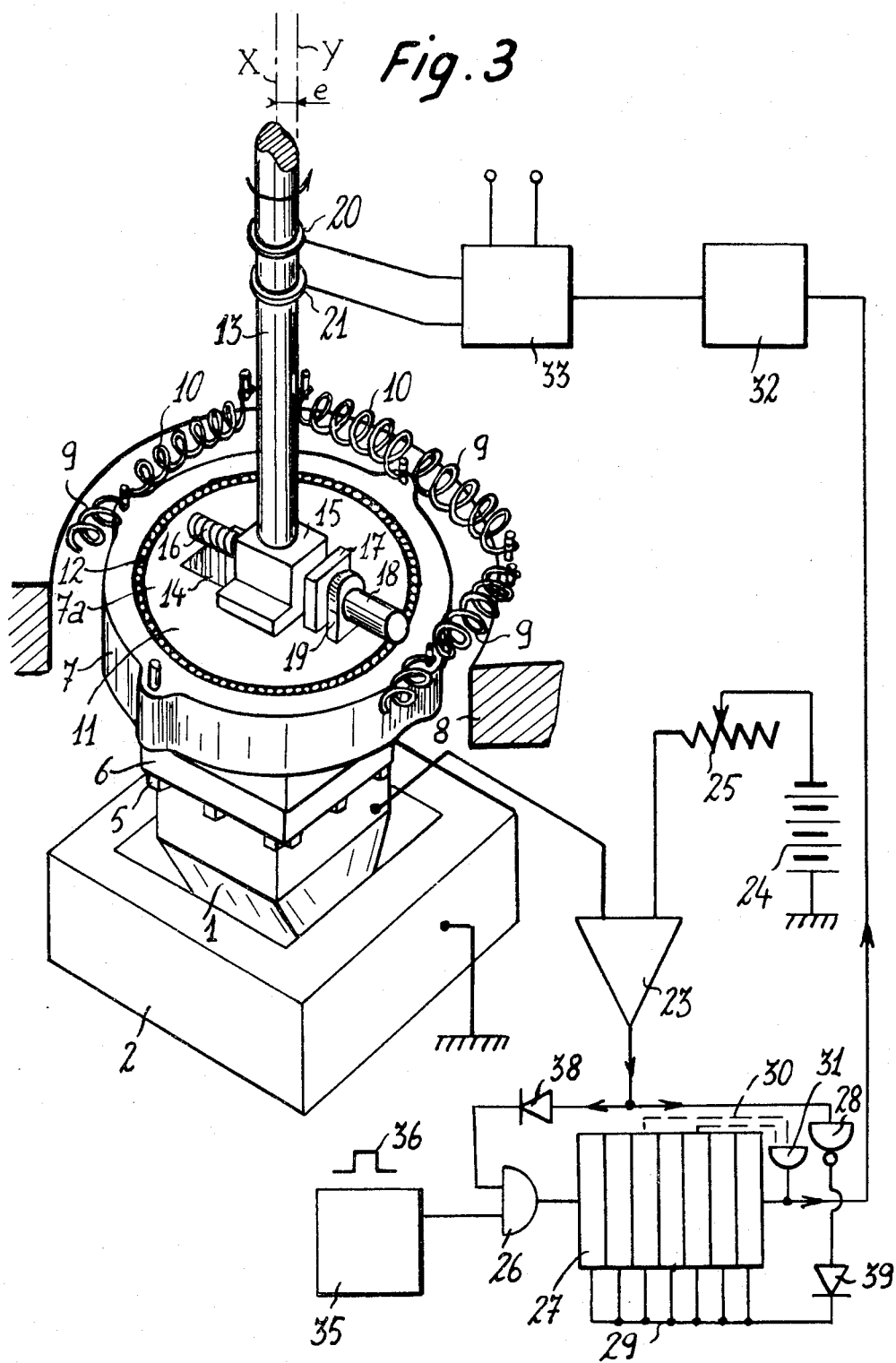
Figure 4:
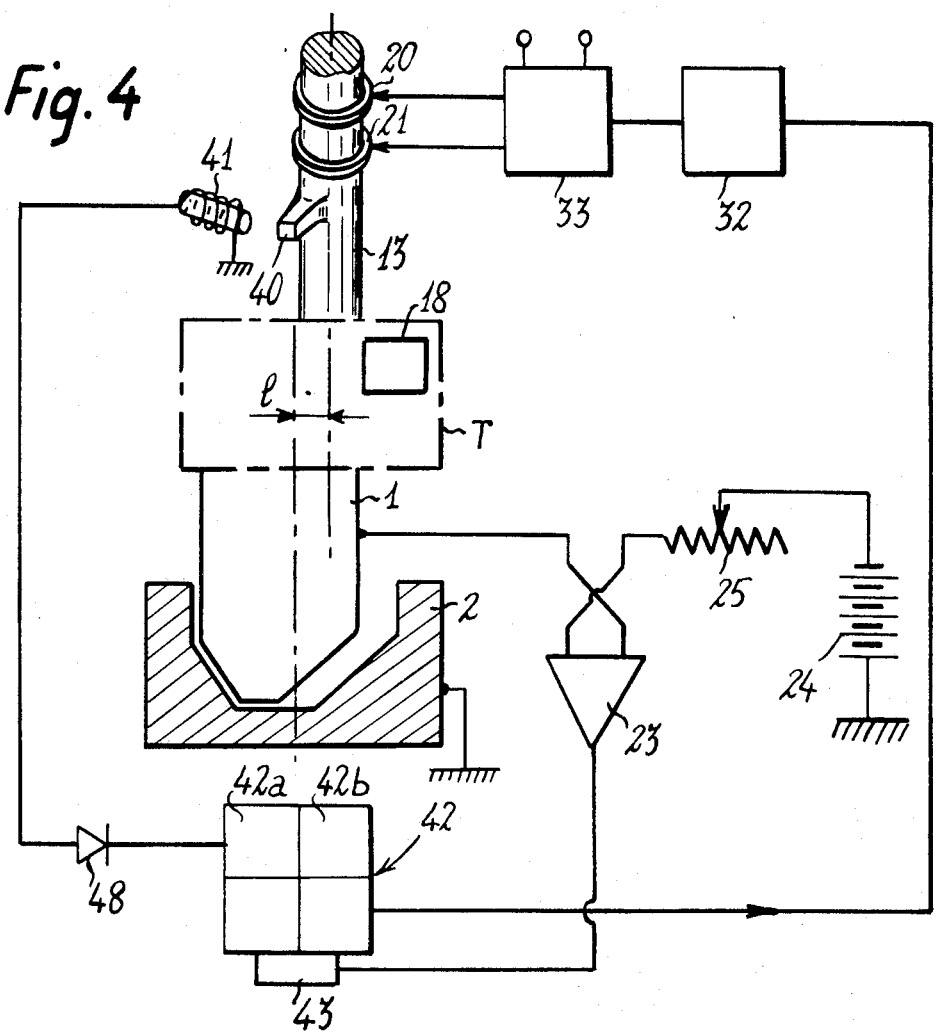
Figure 5:
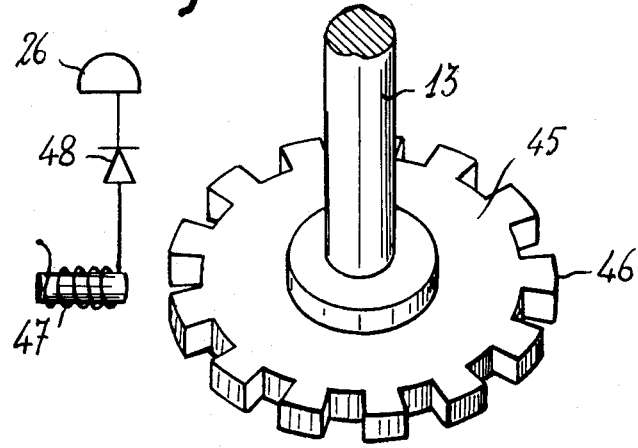

The following complementary description will serve to explain the practical application of the invention, reference being made to the accompanying drawings, wherein:

- FIG. 1 is a partial and diagrammatic horizontal sectional representation of a portion of electrode and of a portion of workpiece during a machining operation;
- FIG. 2 is a diagram showing the variation in electrode-workpiece voltage during a movement of travel;
- FIGS. 3 and 4 shown diagrammatically in detail two examples of application of the invention;
- FIG. 5 shows an alternative form of construction of a pulse generator associated with a rotary system.

In FIG. 1, an electrode 1 which undergoes an orbital movement or a circular translational movement having a radius r in the direction of the arrows f completes the machining of the internal wall AB or a workpiece 2 by means of the electrode face ab and the machining of the adjacent internal wall BC by means of the electrode face bc. The opposite faces respectively of the workpiece and of the electrode can be considered as faces of male and female portions of parallel pyramid frustums. The portion which has been formed in the workpiece has been obtained by "recessing" of said workpiece by means of the electrode to which was accordingly imparted a simple movement of vertical downward displacement.

In the position of the electrode 1 as shown in full lines, the electrode face ab is at the minimum distance from the workpiece face AB and much closer to the workpiece than the face bc with respect to the face BC.

The voltage which can be read on a voltmeter which is connected in shunt between the electrode and the workpiece is established at a minimum value which corresponds in practice at a given instant to the sparking voltage between the two points of the respective faces ab and AB which are located nearest each other.

As the movement of travel of the electrode (or the workpiece) continues in the direction indicated by the arrows f, the face ab progressively moves away from AB whilst the face bc moves nearer to BC.

The electrode-workpiece voltage therefore initially increases and can attain its open-circuit value if the spark (which may increase in length to a certain extent) can no longer be maintained. When the distance bc-BC becomes shorter than the distance ab-AB, the voltage begins to decrease. This takes place as soon as the sparks can again be initiated and this voltage passes through a minimum in the position $b_1c_1$ of the face bc (position 1a of the electrode as shown in a broken line).

During the following movement of travel of the electrode 1, the minimum values of voltage at the successive passages of ab next to AB and bc next to BC will be higher than the preceding by virtue of the machining operation which was previously performed and as a consequence of the increase in the electrode-workpiece distance.

Thus, during a movement of travel having a time-duration T (see FIG. 2), the variations in potential between the electrode and the workpiece can be represented by a curve as designated by the reference 3.

The value of open-circuit voltage $V_o$ of the generator which supplies power for the machining operation is attained when the distance between the electrode and the workpiece is too great to permit the appearance of sparks at this value of voltage (time intervals 4a, 4b, 4c) whilst the value of the voltage is lower as said distance is shorter and the spark passes more readily.

Broadly speaking, the curve 3 therefore has a generally cyclic shape corresponding to the shape of electrode employed with variations which are dependent on the state of surface of each face, the minimum values of the curve being determined by the maximum elevations and depressions of said surfaces.

It is consequently possible to choose a voltage $V_1$ which is lower than $V_o$ an corresponds to a distance between faces such that a predetermined variation in eccentricity which is smaller than said distance can be imposed. This condition will be satisfied if the voltage between electrode and workpiece always remains higher than said value $V_1$ during a movement of travel.

In order to gain a clearer idea, if the value $V_o$ is 100 volts, for example, the value $V_1$ will be 85 volts, for example.

FIG. 3 shows a first assembly which makes it possible to obtain this result.

In this figure, the electrode 1 is clamped by means of studs 5 against an electrode-holder 6 and this latter is rigidly fixed to a ring 7. While remaining parallel to itself in its horizontal plane, said ring is capable of moving in all directions to a small extent with respect to a frame 8.

This result can be obtained in various ways, for example as shown in the figure by means of pairs of oppositely-acting coil springs 9, 10 which produce action tangential to the periphery of the ring 7 and are applied against the frame 8.

These pairs of springs prevent the ring 7 from rotating either in one direction or in the other but enable this latter to carry out translational movements of small amplitude in all directions by reason of the negligible variations in length to which said springs are subjected as a result of such translational movements.

It is possible in known manner to replace the pairs of springs 9, 10, especially by two guides arranged in crossed relation or by a double supporting parallelogram. Alternatively, provision can be made for more complex assemblies as described for example in the above-cited U.S. Pat. application No 74,04,869.

A disc 11 which is driven in rotation by a shaft 13 rotates with interposition of a bearing 12 of the roller, ball or needle type within a circular opening 7a of the ring 7.

The head 15 provided at the lower end of the shaft 13 slides without play within a diametral opening 14 of the disc 11 and the position of said head within said opening is defined by a diametral micrometer-screw 6 applied against a bearing 17 which is rigidly fixed to the disc 11 and driven as required by an electric motor 18 if necessary through a reduction-gear unit 19.

The motor is supplied through slip-rings 20 and 21 by means of leads (not shown in the drawings). Thus the axis X of the shaft 13 can be displaced off-center with respect to the axis Y of the disc 11 by a distance e which varies by way of example from zero to a few millimeters.

It is readily apparent that the adjustable eccentric displacement of the shaft 13 with respect to the disc can be obtained by means of a motor 18 or by other mechanisms which are capable of producing a successive or step-by-step variation, especially by means of eccentric mounting of the shaft 13 in the disc 11, by means of a ramp or skew-face assembly in which the end of the shaft 13 is mounted in the disc 11; by way of example, said ramp can be a spiral in the plane of the disc or in the form of an inclined plane at right angles to said disc.

The assembly which has just been described is usually secured by means of its frame 8 which incorporates the driving motor of the shaft 13 to a device for the automatic vertical feed motion of the electrode. This device is employed for initial recessing of the cavity but is of no further use in the lateral machining operation with automatic adjustment of electrode eccentricity in accordance with the invention.

In the embodiment which is illustrated, the potential of the electrode 1 with respect to the workpiece 2 which is connected to ground is applied to one of the inputs of a voltage comparator 23, there being applied to the other input a reference potential with respect to ground, said voltage being supplied by a source 24 and adjusted by a potentiometer 25.

The output voltage of the comparator is applied, through a diode 38, to one of the inputs of an AND-gate 26, there being applied to the other input the recurrent pulses 36 of a clock 35 which forms a time base.

The output of the gate 26 is connected to the input of a binary counter 27 formed by bistable multivibrators or flip-flops mounted in cascade.

The output of the comparator 23 is also connected through a NOT gate 28 to the zero-reset leads 29 of the counter 27.

The capacity of said counter can be adjusted by means of the leads 30 which connect a certain number of flip-flops to the output of the counter through an AND-gate 31.

The output of the counter 27 is connected to a timing circuit 32 such as a monostable multivibrator which is capable of delivering a control pulse of well-determined duration to a relay 33 which supplies the motor 18.

Under these conditions, when the voltage between electrode and workpiece exceeds the reference voltage, for example at the instant $t_o$ (FIG. 2), a signal is directed towards the gate 26 which then permits the transmission of recurrent pulses 36. These latter are admitted into the counter 27 as long as the output signal of the comparator 23 is positive, for example; as soon as said signal is reversed at the instant $t_1$ (FIG. 2), the counting operation is discontinued and a zero-reset signal is delivered to the counter 27 via the NOT gate 28. Diodes 38 an 39 respectively prevent the emission of spurious signals.

If the output signal of the comparator remains positive during the time interval corresponding to the total capacity of the counter whilst the curve 3 remains above the level $V_1$, a signal is directed to the timing circuit 32 which supplies the motor 18 through the relay 33 in order to permit an increase in eccentricity e by one step.

The same signal can be employed for reducing the operating regime of the machining generator.

The motor 18 can also be a stepping motor and the assembly 32, 33 can be arranged for delivering a predetermined number of pulses to said motor in order to ensure that the amplitude of rotational motion of this latter is defined with strict accuracy.

The assembly which is illustrated in FIG. 3 makes it necessary to ensure that, when the speed of rotation of the shaft 13 is not constant, the capacity of the counter 27 is adjusted (by means of the leads 30) in order that said capacity should correspond to at least one revolution of the shaft 13.

The operation of the assembly which is shown in FIG. 4 is independent of the speed of rotation of the shaft 13. By way of example, said shaft carries a magnetic lug which influences a winding 41 and initiates the appearance of a pulse in this latter at each revolution of the shaft. These pulses are directed through a diode 48 to a counter 42 which has only two flip-flops 42a and 42b. The output of the flip-flop 42b is connected to the timing circuit 32 whilst the output of the comparator 23, the inputs of which are reversed with respect to the arrangement shown in FIG. 3, is connected to the zero-reset leads 43 of the two flip-flops.

Thus a signal which ensures an increase in eccentricity reaches the assembly 32, 33 only if, during a complete movement of travel, that is to say between two consecutive signals formed by the winding 41 at the time of passage of the lug 40, no zero-reset signal has appeared (reference voltage of higher value than the electrode-workpiece voltage).

As shown in FIG. 5, it is possible in the case of FIG. 3 to avoid the need for any adjustment of the counter 27 by generating the same number of pulses at each revolution of the shaft 13. To this end, the shaft 13 is rigidly fixed to a ferromagnetic toothed wheel 45, the teeth 46 of which pass in front of a winding 47 which is connected to the gate 26 through a diode 48.

Since the speed of rotation of the shaft is relatively low, the lug 40 or the teeth 46 can have small dimensions in order to produce pulses of short duration. In this case, the circuit assembly which provides a connection between the counters and the electromagnetic windings 41 or 47 comprises a pulse-reshaping stage. More simply, if the speed of rotation is very low, the windings 41 or 47 can be replaced by frictional contacts in cooperating relation with slip-rings to which voltage is applied.

As can be readily understood, the invention is not limited to the embodiments hereinabove described and it is accordingly possible to devise a large number of alternative forms of construction without departing either from the scope or the spirit of the invention. From this it follows that the timing system can be of any known type and controlled by different means within the capacity of any one versed in the art.

We claim:

1. A method for automatically increasing the eccentricity of a circular translation movement of an electrode relative to a workpiece, in a spark erosion machine, said movement having a period of travel, a machining voltage being applied between said electrode and said workpiece, comprising the steps of:

measuring said machining voltage between said electrode and said workpiece;

generating a reference voltage;

comparing said machining voltage and said reference voltage;

measuring the time interval during which said machining voltage remains continuously higher than said reference voltage;

generating a control signal only said time interval is at least equal to said period of travel; and controlling the increase of said eccentricity in response to said control signal.

2. A spark-erosion machine comprising an electrode for machining a workpice, means for applying between said electrode and said workpiece a machining voltage, driving means to drive said electrode and workpiece in a circular translation movement relative to each other, said circular translation movement having an eccentricity and a period of travel, and means for automatically increasing said eccentricity, said means comprising:

means for measuring the machining voltage between said electrode and said workpiece;

a voltage supply for delivering a reference voltage;

comparision means for comparing said machining voltage and said reference voltage;

means for measuring the time interval during which said machining voltage has remained continuously higher than said reference voltage;

means for generating a control signal only when said time interval is at least equal to said period of travel; and an electric motor controlled by said control signal to act upon said driving means so as to increase said eccentricity.

3. A spark-erosion machine according to claim 2, the electrode being carried by a rotating shaft, comprising at least a magnetic lug carried by said shaft and passing in front of a fixed winding.

4. A spark-erosion machine according to claim 3, said shaft carrying a toothed wheel with a plurality of magnetic teeth.

5. A spark-erosion machine according to claim 3, said means for generating a control signal being constituted by a two-stage binary counter with an input, an output and a zero-reset connection, said input being connected to said fixed winding, said reset connection being connected to said comparison means and said output to said motor.

6. A spark-erosion machine according to claim 2, comprising a clock which emits periodic pulses of known period and wherein said means for generating a control signal is constituted by a counter having a predetermined capacity, an input, an output and a zero-reset connection, by an AND gate with two inputs and one output an by a NOR gate, said comparison means being connected to one of said AND gate inputs, and, through said NOR gate to said zero-reset connection of said timer, the other input of said AND gate being connected to said clock.

7. A spark-erosion machine according to claim 6, said capacity of said timer, for a determined clock pulses period, corresponding to said period of travel.

8. A spark-erosion machine according to claim 2, said electric motor being a stepping motor.

* * * * *